(12) United States Patent
Zhao

(10) Patent No.: US 9,157,312 B2
(45) Date of Patent: Oct. 13, 2015

(54) EMAT ACOUSTIC SIGNAL MEASUREMENT USING MODULATED GAUSSIAN WAVELET AND HILBERT DEMODULATION

(75) Inventor: Jinsong Zhao, Houston, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 958 days.

(21) Appl. No.: 13/293,325

(22) Filed: Nov. 10, 2011

(65) Prior Publication Data

US 2012/0069705 A1 Mar. 22, 2012

Related U.S. Application Data

(63) Continuation-in-part of application No. 12/268,110, filed on Nov. 10, 2008, now abandoned.

(51) Int. Cl.
*G01V 1/44* (2006.01)
*E21B 47/00* (2012.01)

(52) U.S. Cl.
CPC .............. *E21B 47/0005* (2013.01); *G01V 1/44* (2013.01)

(58) Field of Classification Search
CPC .............................. G01V 1/44; E21B 47/0005
USPC ......................................... 367/35, 38, 43, 50
See application file for complete search history.

(56) References Cited

U.S. PATENT DOCUMENTS

| | | | |
|---|---|---|---|
| 4,255,798 A * | 3/1981 | Havira | 367/35 |
| 4,928,269 A * | 5/1990 | Kimball et al. | 367/35 |
| 5,216,638 A | 6/1993 | Wright | |
| 5,491,668 A | 2/1996 | Priest | |
| 5,644,550 A | 7/1997 | Priest | |
| 5,831,934 A * | 11/1998 | Gill et al. | 367/25 |
| 6,041,861 A * | 3/2000 | Mandal et al. | 166/250.01 |
| 6,366,531 B1 | 4/2002 | Varsamis et al. | |
| 7,311,143 B2 | 12/2007 | Engels et al. | |
| 2007/0005251 A1 | 1/2007 | Chemali et al. | |
| 2007/0206439 A1 | 9/2007 | Barolak et al. | |
| 2008/0128166 A1 * | 6/2008 | Forgang et al. | 175/50 |
| 2010/0118648 A1 | 5/2010 | Zhao | |
| 2010/0118649 A1 * | 5/2010 | Zhao | 367/35 |

OTHER PUBLICATIONS

Qian, "Digital Filter Banks and the Wavelet Transform", website http://www.informit.com/articles/article.aspx?p=27268&segNum=3, published Jun. 21, 2002 (retrieved Oct. 15, 2014).*

* cited by examiner

*Primary Examiner* — Eric Bolda
(74) *Attorney, Agent, or Firm* — Mossman Kumar & Tyler PC

(57) ABSTRACT

Casing signals generated by an EMAT in a borehole are processed using at least two orthogonal band-limited filters. The band-limited filters may include Gaussian or Cauchy Wavelet filters. By using the Hilbert transform, an envelope of the filtered signals is determined and amplitudes and arrival times of individual arrivals are estimated. These can be used to estimate casing and cement properties.

23 Claims, 16 Drawing Sheets

US 9,157,312 B2

EMAT ACOUSTIC SIGNAL MEASUREMENT USING MODULATED GAUSSIAN WAVELET AND HILBERT DEMODULATION

CROSS-REFERENCE TO RELATED APPLICATION

This application is a continuation-in-part of U.S. patent application Ser. No. 12/268,110, filed Nov. 10, 2008, and claims the benefit of priority from the aforementioned application.

FIELD OF THE DISCLOSURE

The disclosure relates generally to the field of the evaluation of wellbore casing. More specifically the present disclosure relates to a method and apparatus to provide for the analysis of casing within a wellbore environment by producing and recording characteristics of waveforms traversing the casing and cement.

BACKGROUND OF THE DISCLOSURE

As illustrated in FIG. 1 wellbores typically comprise casing 8 set within the wellbore 5, where the casing 8 is bonded to the wellbore by adding cement 9 within the annulus formed between the outer diameter of the casing 8 and the inner diameter of the wellbore 5. The cement bond not only adheres to the casing 8 within the wellbore 5, but also serves to isolate adjacent zones (e.g. $Z_1$ and $Z_2$) within an earth formation 18. Isolating adjacent zones can be important when one of the zones contains oil or gas and the other zone includes a non-hydrocarbon fluid such as water. Should the cement 9 surrounding the casing 8 be defective and fail to provide isolation of the adjacent zones, water or other undesirable fluid can migrate into the hydrocarbon producing zone thus diluting or contaminating the hydrocarbons within the producing zone, and increasing production costs, delaying production or inhibiting resource recovery.

To detect possible defective cement bonds, downhole tools 14 have been developed for analyzing the integrity of the cement 9 bonding the casing 8 to the wellbore 5. These downhole tools 14 are lowered into the wellbore 5 by wireline 10 in combination with a pulley 12 and typically include transducers 16 disposed on their outer surface formed to be acoustically coupled to the fluid in the borehole. These transducers 16 are generally capable of emitting acoustic waves into the casing 8 and recording the amplitude of the acoustic waves as they travel, or propagate, across the casing 8. Characteristics of the cement bond, such as its efficacy, integrity and adherence to the casing, can be determined by analyzing characteristics of the acoustic wave such as attenuation. Typically the transducers 16 are piezoelectric devices having a piezoelectric crystal that converts electrical energy into mechanical vibrations or oscillations transmitting acoustic wave to the casing 8. Piezoelectric devices typically couple to a casing 8 through a coupling medium found in the wellbore. Coupling mediums include liquids that are typically found in wellbores. When coupling mediums are present between the piezoelectric device and the casing 8, they can communicate the mechanical vibrations from the piezoelectric device to the casing 8. However, lower density fluids such as gas or air and high viscosity fluids such as some drilling mud may not provide adequate coupling between a piezoelectric device and the casing 8. Furthermore, the presence of sludge, scale, or other like matter on the inner circumference of the casing 8 can detrimentally affect the efficacy of a bond log acquired with a piezoelectric device. Thus for piezoelectric devices to provide meaningful bond log results, they must cleanly contact the inner surface of the casing 8 or be employed in wellbores, or wellbore zones, having liquid within the casing 8. Another drawback faced when employing piezoelectric devices for use in bond logging operations involves the limitation of variant waveforms produced by these devices. Fluids required to couple the wave from the transducer to the casing only conduct compressional waves, thus limiting the wave types that can be induced in or received from the casing. A great deal of information is derivable from variant acoustical waveforms that could be used in evaluating casing, casing bonds, and possibly even conditions in the formation 18. Therefore, there exists a need to conduct bond logging operations without the presence of a particular couplant. A need exists for a bond logging device capable of emitting and propagating into wellbore casing numerous types of waveforms, and recording the waveforms.

U.S. Pat. No. 7,311,143 to Engels et al., having the same assignee as the present disclosure and the contents of which are incorporated herein by reference, discloses a method and apparatus for inducing and measuring acoustic waves, including shear waves, within a wellbore casing to facilitate analysis of wellbore casing, cement and formation bonding. An acoustic transducer is provided that is magnetically coupled to the wellbore casing and is comprised of a magnet combined with a coil, where the coil is attached to an electrical current. The acoustic transducer is capable of producing and receiving various waveforms, including compressional waves, shear waves, Rayleigh waves, and Lamb waves. The transducer remains coupled to the wellbore casing as the tool traverses portions of the casing. An important aspect of the method of Engels is the ability to identify different modes of propagation of acoustic signals within the casing. The amplitude and times of arrival of the different signals is indicative of properties of the casing. The present disclosure provides an improved method for the estimation of arrival times and amplitudes of these different modes. For the purposes of the present disclosure, the individual arrivals may be referred to as "events."

SUMMARY OF THE DISCLOSURE

One embodiment of the disclosure is a method of characterizing a casing installed in a borehole in an earth formation. The method includes activating a transducer at least one azimuthal orientation in the borehole and generating an acoustic pulse; receiving a signal comprising a plurality of events resulting from the generation of the acoustic pulse; bandpassing the received signal using two modulated filters, the two modulated filters being orthogonal to one another, and providing a bandpassed signal; estimating an envelope of the bandpassed signal; and estimating from the envelope of the bandpassed signal an arrival time of each of the plurality of events, the arrival times being characteristic of a property of the casing, and/or a cement in an annulus between the casing and the formation.

Another embodiment of the disclosure is an apparatus for characterizing a casing installed in a borehole in an earth formation. The apparatus includes a transducer configured to generate an acoustic pulse at least one azimuthal orientation in the borehole; a receiver configured to receive a signal comprising a plurality of events resulting from the generation of the acoustic pulse; and a processor configured to: bandpass the received signal using two modulated filters, the two modulated filters being orthogonal to one another, and provide a bandpassed signal; estimate an envelope of the bandpassed signal; and estimate from the envelope of the received signal an arrival time of each of the plurality of events, the arrival times being characteristic of a property of at least one of: (i) the casing and (ii) a cement in an annulus between the casing and the formation.

Another embodiment of the disclosure is a non-transitory computer-readable medium product accessible to at least one processor. The non-transitory computer-readable medium including instructions which enable the at least one processor to characterize a property of a casing in a borehole in an earth formation using a signal comprising a plurality of events resulting from generation of an acoustic pulse by a transducer in the borehole, the instructions including bandpassing the signal using two modulated functions, the two modulated functions being orthogonal to one another, estimating an envelope of the bandpassed signal and estimating from the envelope an arrival time of each of the plurality of events.

BRIEF DESCRIPTION OF THE FIGURES

The present disclosure and its advantages will be better understood by referring to the following detailed description and the attached drawings in which.

DETAILED DESCRIPTION OF THE DISCLOSURE

Figure 1:
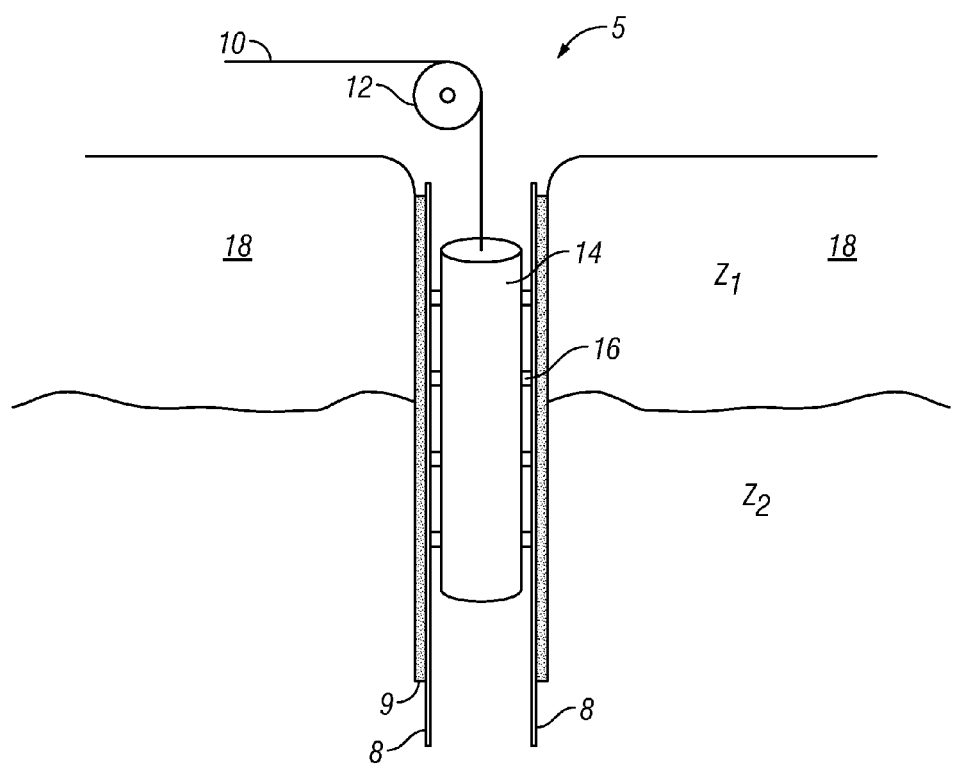
FIG. 1 depicts a partial cross section of prior art downhole cement bond log tool disposed within a wellbore.
Figure 2A:
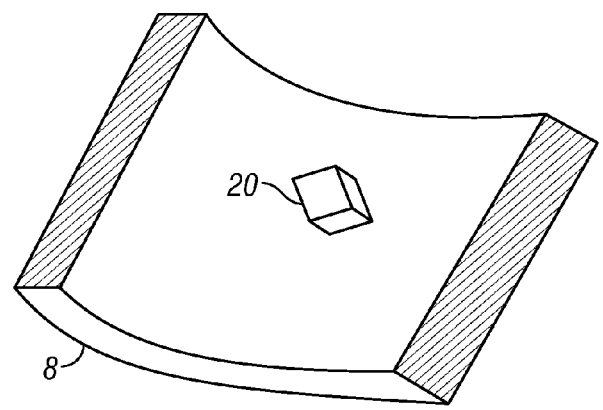
FIGS. 2A-2B schematically illustrate a magnetic coupling transmitter disposed to couple to a section of casing.

As illustrated in FIG. 2A, a magnetically coupled transducer 20 is positioned at any desired attitude proximate to a section of casing 8. For the purposes of clarity, only a portion of the length and diameter of a section of casing 8 is illustrated and the magnetically coupled transducer 20 is shown schematically in both FIG. 2A and FIG. 2B. The magnetically coupled transducer 20 may be positioned within the inner circumference of the tubular casing 8, but the magnetically coupled transducer 20 can also be positioned in other areas.

Figure 2B:
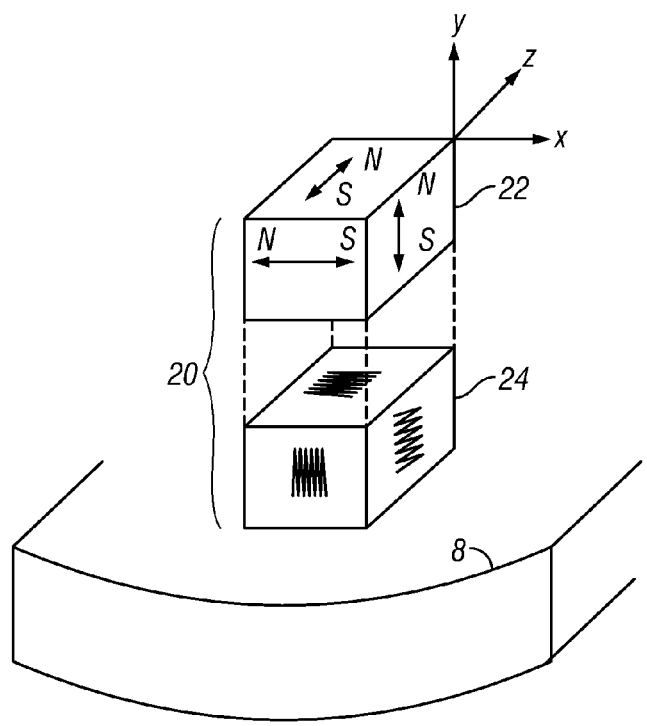

For any particular transducer 20, more than one magnet (of any type for example permanent, electro-magnetic, etc.) may be combined within a unit; such a configuration enables inducing various waveforms and facilitating measurement and acquisition of several waveforms. A transducer 20 capable of transmitting or receiving waveforms in orthogonal directions is schematically illustrated in FIG. 2B. While a schematic magnet 22 with orthogonal magnetic fields is illustrated, a single-field relatively large magnet with multiple smaller coils 24 (which coils may be disposed orthogonally) may be employed to form versatile transducers.

In embodiments provided by the present disclosure that are illustrated schematically in FIGS. 2A and 2B, the magnetically coupled transducer 20 is comprised of a magnet 22 and a coil 24, where the coil 24 is positioned between the magnet 22 and the inner circumference of the casing 8. An electrical current source (not shown) is connectable to the coil 24 capable of providing electrical current to the coil 24. The magnet 22, may be one or more permanent magnets in various orientations or can also be an electro-magnet, energized by either direct or alternating current. FIG. 2B schematically illustrates orthogonal magnetic and coil representations. One or more magnets or coils may be disposed within a downhole tool to affect desired coupling and/or desired wave forms such as the direct inducing of shear waves into casing 8. While the coil is illustrated as disposed between the magnet and the casing, the coil may be otherwise disposed adjacent to the magnet.

The coil 24 may be energized when the magnetically coupled transducer 20 is proximate to the casing 8 to produce acoustic waves within the material of the casing 8. For example the coil may be energized with a modulated electrical current. Thus the magnetically coupled transducer 20 operates as an acoustic transmitter.

The magnetically coupled transducer 20 can also operate as a receiver capable of receiving waves that traversed the casing and cement. The magnetically coupled transducer 20 may be referred to as an acoustic device. As such, the acoustic devices of the present disclosure function as acoustic transmitters or as acoustic receivers, or as both.

Figure 3:
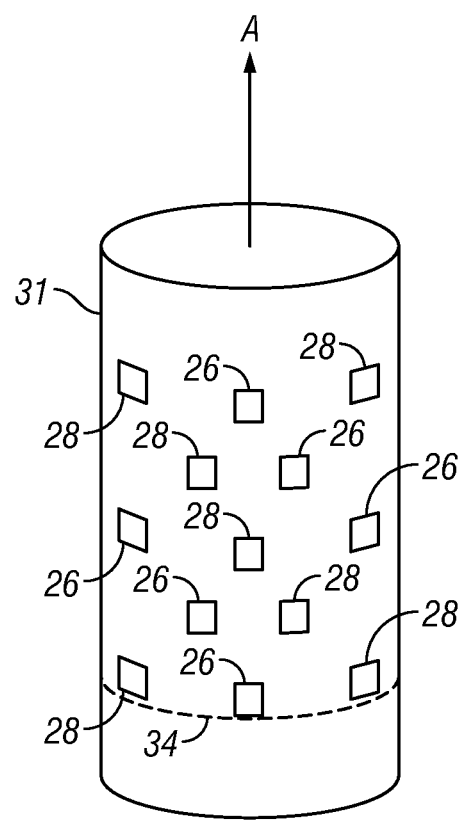
FIG. 3 shows an exemplary EMAT tool disposed within a wellbore.

An exemplary embodiment of the tool as illustrated in FIG. 3 provides a sonde 30 shown having acoustic devices disposed on its outer surface. The acoustic devices comprise a series of acoustic transducers, both transmitters 26 and receivers 28, where the distance between each adjacent acoustic device on the same row may be substantially the same. With regard to the configuration of acoustic transmitters 26 and acoustic receivers 28 shown in FIG. 3, while the rows 34 radially circumscribing the sonde 30 can comprise any number of acoustic devices (i.e. transmitters 26 or receivers 28), in one embodiment, each row 34 comprise five or more of these acoustic devices (the preference for five or more devices is for devices with the transmitters and receivers radially arranged around the circumference). The acoustic transmitters 26 may be magnetically coupled transducers 20 of the type of FIGS. 2A and 2B comprising a magnet 22 and a coil 24. Optionally, the acoustic transmitters 26 can comprise electromagnetic acoustic transducers.

Referring now again to the configuration of the acoustic transmitters 26 and acoustic receivers 28 of FIG. 3, the acoustic transducers comprising transmitters 26 and receivers 28 can be arranged in at least two rows where each row comprises primarily acoustic transmitters 26 and a next adjacent row comprises primarily acoustic receivers 28. Optionally, as shown in FIG. 3, the acoustic devices within adjacent rows in this arrangement are aligned in a straight line along the length of the sonde 30.

While only two circumferential rows 34 of acoustic devices are shown in FIG. 3, variations and placement of transducers and arrangements in rows can be included depending on the capacity and application of the sonde 30. Another arrangement is to have one row of acoustic transducers 26 followed by two circumferential rows of acoustic receivers 28 followed by another row of acoustic transducers 26. As is known in the art, advantages of this particular arrangement include the ability to make a self-correcting acoustic measurement. Attenuation measurements are made in two directions using arrangements of two transmitters and two receivers for acquisition of acoustic waveforms. The attenuation measurements may be combined to derive compensated values that do not depend on receiver sensitivities or transmitter power.

Figure 4:
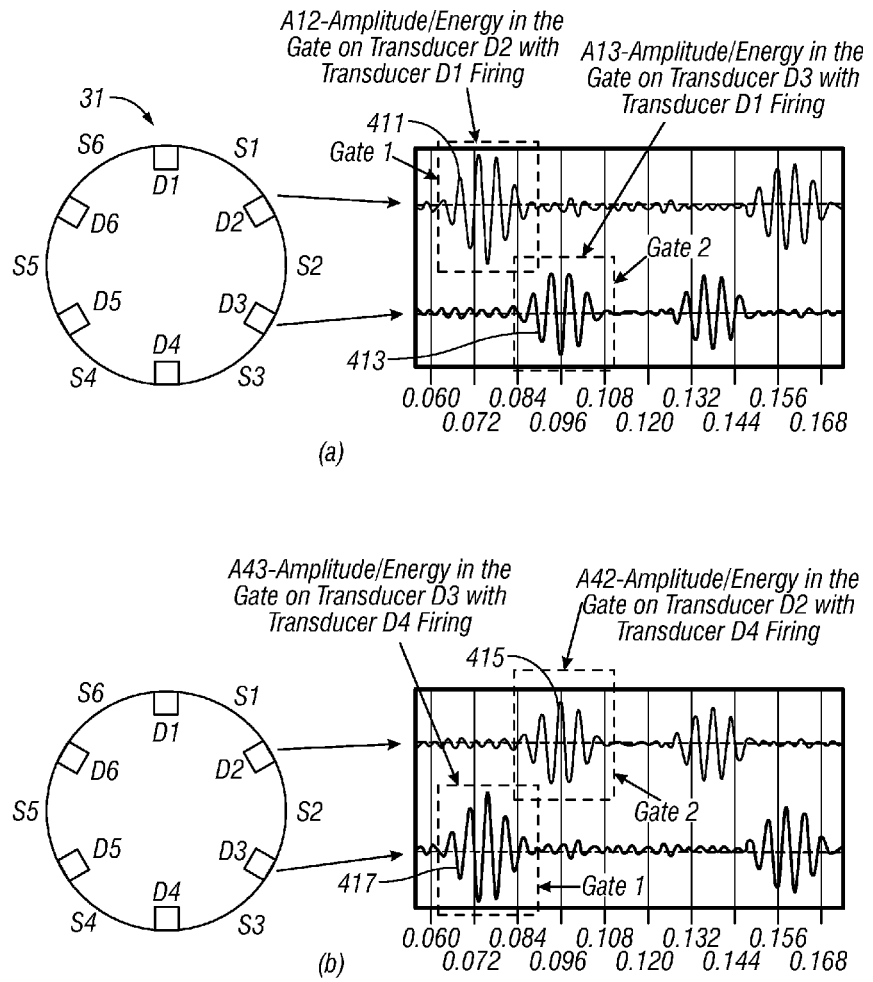
FIGS. 4(a), 4(b) show exemplary signals recorded using six transducers.

FIG. 4(*a*) shows a cross-section of the sonde in which six transducers D1, D2, D3, D4, D5 and D6 are shown around the circumference of the sonde. The six transducers define six sectors S1, S2, S3, S4, S5 and S6. Shown in FIG. 4(*a*) are exemplary signals 411 and 413. The signal 411 depicts a signal at transducer D2 resulting from the activation of transducer D1, while the signal 413 shows the signal at transducer D3 resulting from the activation of transducer D1. Similarly, 415 shows the signal at D2 resulting from the activation of transducer D4 and 417 shows the signal at D2 resulting from the activation of transducer D4.

We denote by $A_{ij}$ the signal at transducer j resulting from the activation of transducer i. Then the attenuation of the signals in sector S2 can be represented by $$A_{S2} = 10 \log_{10} \frac{\left(\frac{A_{12}A_{43}}{A_{13}A_{42}}\right)}{\Delta}. \qquad (1)$$

Due to the bandwidth limitation, the downhole tool has to demodulate the received signals to estimate their amplitudes (as well as arrival times). Ideally, the received signals are expected as shown in the curves 411, 413, 415, 417 in FIGS. 4(*a*), 4(*b*). A signal-to-noise ratio (SNR) of 60 dB provides for god estimation of arrival times and amplitudes. However, in reality, the SNR of the received signals is only around 30 dB to 40 dB. As discussed in U.S. patent application Ser. No. 11/358,172 (U.S. 2007/0206439) of Barolak et al., having the same assignee as the present disclosure and the contents of which are incorporated herein by reference, shear waves and Lamb waves may be used to determine the integrity of a cement bond. In addition, a problem arises from the fact that the SH0 and SH1 may be excited simultaneously due to the wide spectral of the stimulus signal from the transducers.

Figure 5:
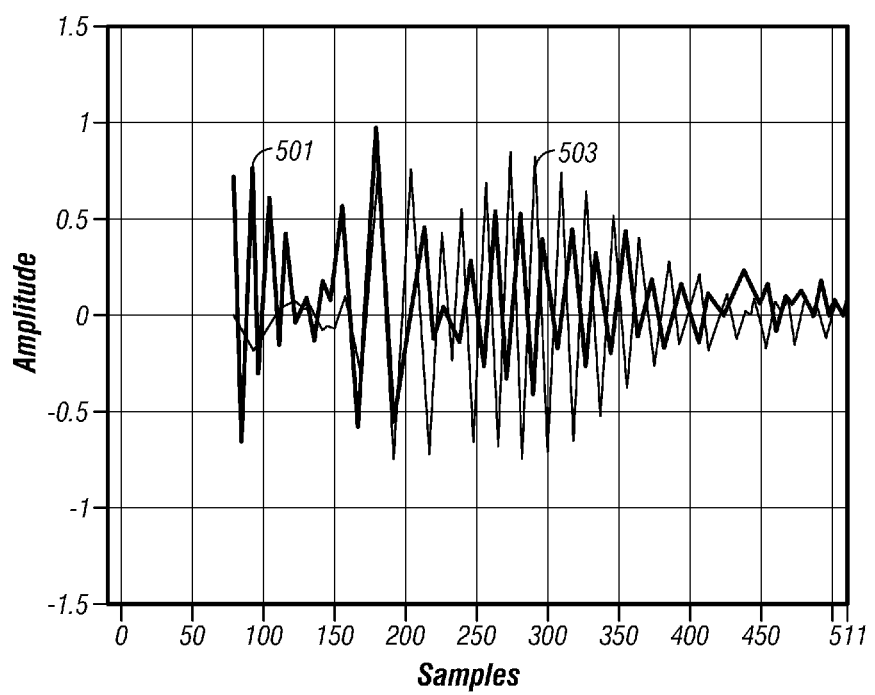
FIG. 5 shows exemplary signals of SH0 and SH1 modes recorded at a transducer.

For the purposes of illustrating the method of the present disclosure, reference is first made to FIG. 5 which shows exemplary signals recorded on a test bench. Two signals recorded under different casing conditions are denoted by 501 and 503. The signal from 0 to about 130 is ringing (from the system). The signal from 130 to about 260 is SH0 with (the center frequency is about 200 KHz), while the signal from 180 to 420 is SH1 with the center frequency is about 280 KHz. As can be seen, the SH0 and the SH1 signals are overlapped each other. In 501, the ringing also affects the SH0. The method used in the present disclosure is to separate the SH0 from SH1. It is to be noted that the curve 501 has a strong SH0 mode while the curve 503 has strong SH1 mode. Of particular interest are the times of arrival of the different modes that may be referred to as "events."

An effective way to estimate the time of arrival of an event is to first estimate the envelope of a wavelet. In one embodiment of the disclosure, this is done by using the Hilbert transform. An acoustic signal f(t) such as that in FIG. 4(*a*) can be expressed in terms of a time-dependent amplitude A(t) and a time-dependent phase θ(t) as:

$$f(t) = A(t) \cos \theta(t) \qquad (2).$$

Its quadrature trace f*(t) then is:

$$f^*(t) = A(t) \sin \theta(t) \qquad (3),$$

and the complex trace F(t) is:

$$F(t) = f(t) + jf^*(t) = A(t)e^{j\theta(t)} \qquad (4).$$

If f(t) and f*(t) are known, one can solve for A(t) as $$A(t) = [f^2(t) + f^{*2}(t)]^{1/2} = |F(t)| \qquad (5)$$

as the envelope of the signal f(t).

One way to determine the quadrature trace f*(t) is by use of the Hilbert transform:

$$f^*(\tau) p.v. \int_{-\infty}^{\infty} \frac{f(t)}{\tau - t} dt, \qquad (6)$$

where p.v. represents the principal value. The Hilbert transform needs a band-limited input signal and is sensitive to wide-band noise. Consequently, before applying the Hilbert transform, two band-pass filters are applied. In the present method, a Gaussian filters are used as the band-pass filters. The band-pass filters may be orthogonal to one another. A first band-pass filter may be configured to be in phase with the signal f(t) and a second band-pass filter may be in quadrature with the signal f(t). In another embodiment, the band-pass filters may use modulated Cauchy Wavelets instead of modulated Gaussian filters.

Figure 6:
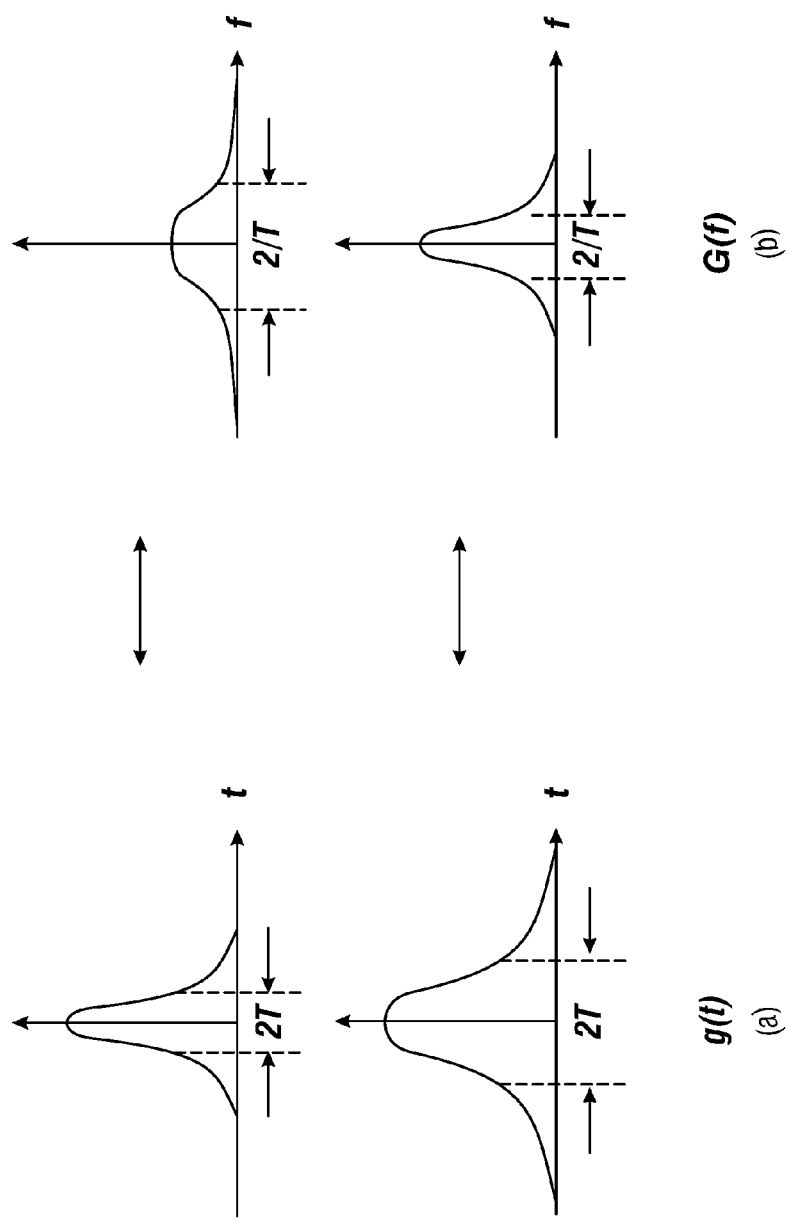
FIGS. 6a, 6b show examples of the Gaussian operator in the time domain and the frequency domain.

FIGS. 6(*a*), 6(*b*) show representations of two different Gaussian filters in the time domain (FIG. 6(*a*)) and in the frequency domain (FIG. 6(*b*)). The Gaussian filter in the time domain is given by $$g(t) = e^{-\pi \left(\frac{t}{\tau}\right)^2}. \qquad (7)$$

Its Fourier transform is given by $$G(f) = \tau e^{-\pi(\tau f)^2} \qquad (8).$$

An advantage of the Gaussian filter that can be seen in FIGS. 6(*a*), 6(*b*) is that there are no ripples in either the time domain or in the frequency domain. By choosing τ, it is possible to capture information carried by the signal.

Figure 7:
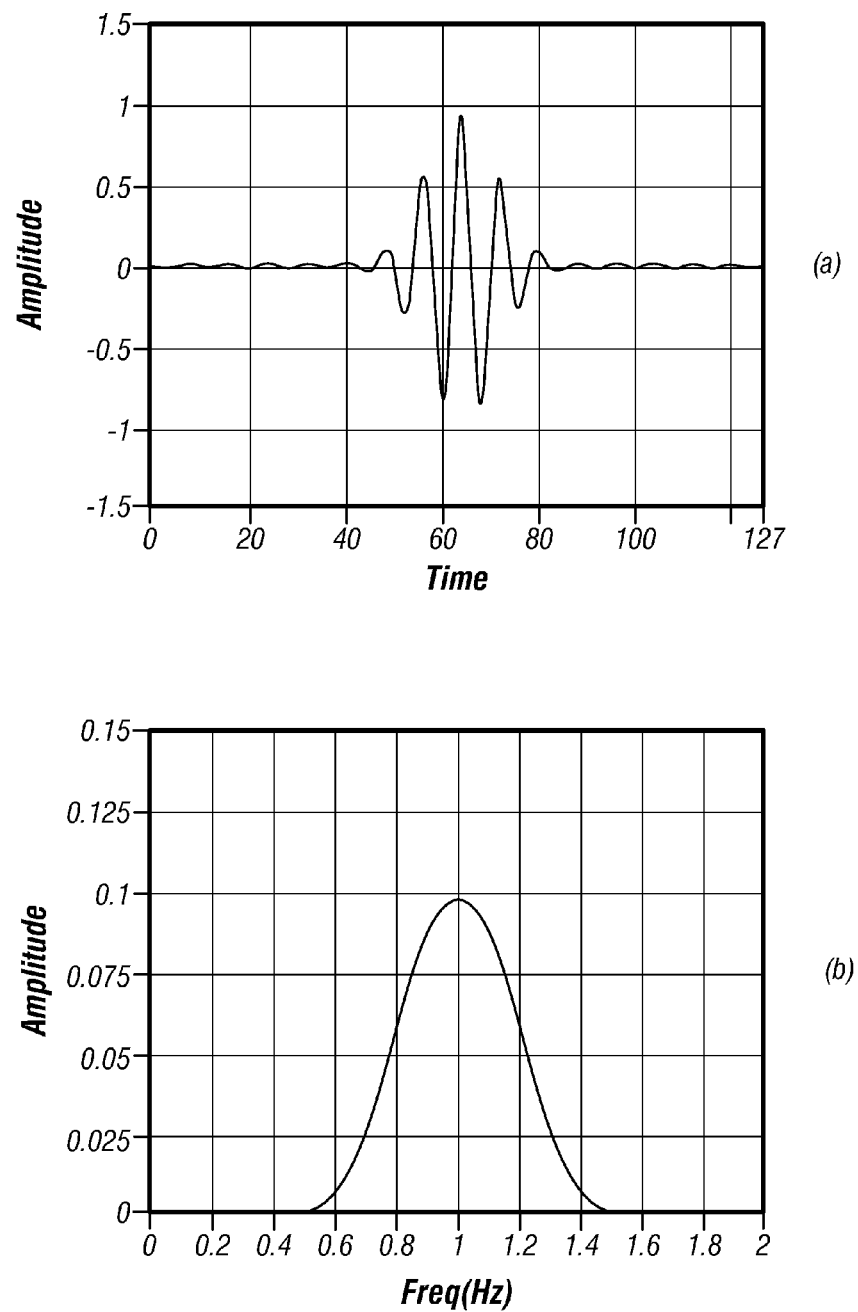
FIGS. 7(a), 7(b) show a modulated Gaussian function in (a) the time domain (a) and (b) the frequency domain.

If the Gaussian function is modulated with a carrier frequency $f_c$ in the time domain, the result is a signal $$g_M(\tau, f_c, t) = g(\tau, t) \cos(2\pi f_c t) \qquad (9),$$

and a frequency domain realization:

$$G_M(\tau, f_c, f) = G(\tau, f) \otimes \delta(f - f_c), \qquad (10),$$

where ⊗ represents a convolution and δ is the Kronecker delta function. Therefore, the $g_M(\tau, t)$ looks like wavelet operator. The localizability (the information time span in time domain and its related frequency bandwidth) is determined by τ and $f_c$. FIG. 7(a) shown an example of $g_M(\tau, f_c, t)$ and FIG. 7(b) shows an example of $G_M(t, f_c, f)$.

In the example above, $f_c$ equals to 1 Hz. The wavelet operator is shown in the time domain and its amplitude spectral response is shown in the frequency domain. From the standpoint of implementation, it is desirable to select the attenuation and bandwidth to control the wavelet operator behaviors (say, −6 dB in power with a certain nominal bandwidth NBW) instead of selecting τ. In the example above, the bandwidth is from −0.2 $f_c$ to +0.2 $f_c$ (NBW$_{-6dB}$=40%).

From eqn. (7) we have $$g(t) = e^{-k*t^2} \quad (11)$$

If we define NBW as $$\mu = \frac{\Delta f}{f_c} \quad (12)$$

and attenuation factor, α in dB, we have $$k = \frac{5(\pi \mu f_c)^2}{\alpha * \ln 10} \quad (13)$$

It is thus possible to choose α and μ to control the spectrum of the wavelet operator $g_M(\alpha,\mu,f_c,t)$.

The wavelet operator is used to reconstruct the acquired signal with additive white noise by a convolution operation. The acquired signal may be denoted by $$x_c(t) = x(t) + n(t) \quad (14)$$

where, x(t) is the acoustic signal and n(t) is white noise. The convolution operation is $$y(t) = x_c(t) \otimes g_M(\alpha,\mu,f_c,t) \quad (15)$$

Figure 8:
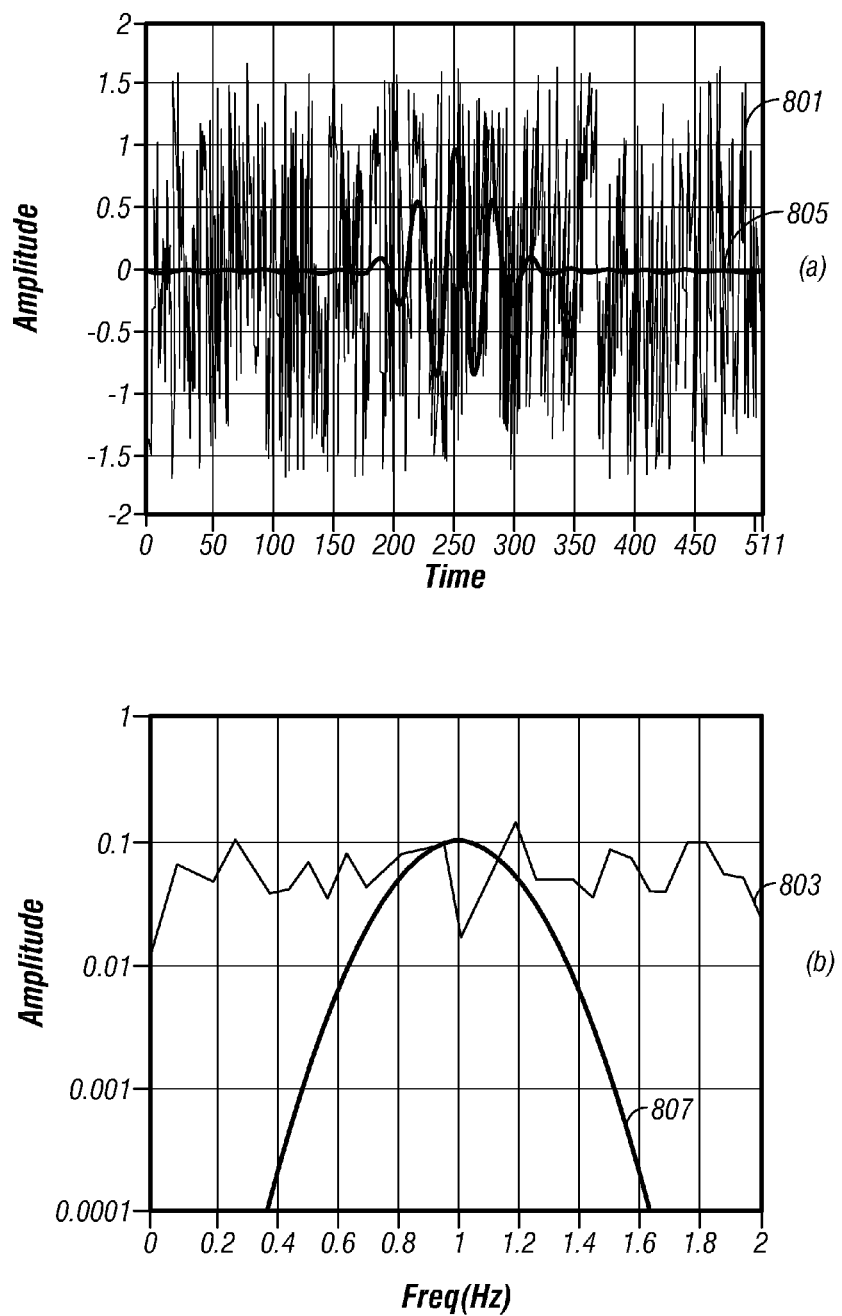
FIGS. 8(a), 8(b) show an exemplary signal and noise (a) in the time domain and in the frequency domain (b)
Figure 9:
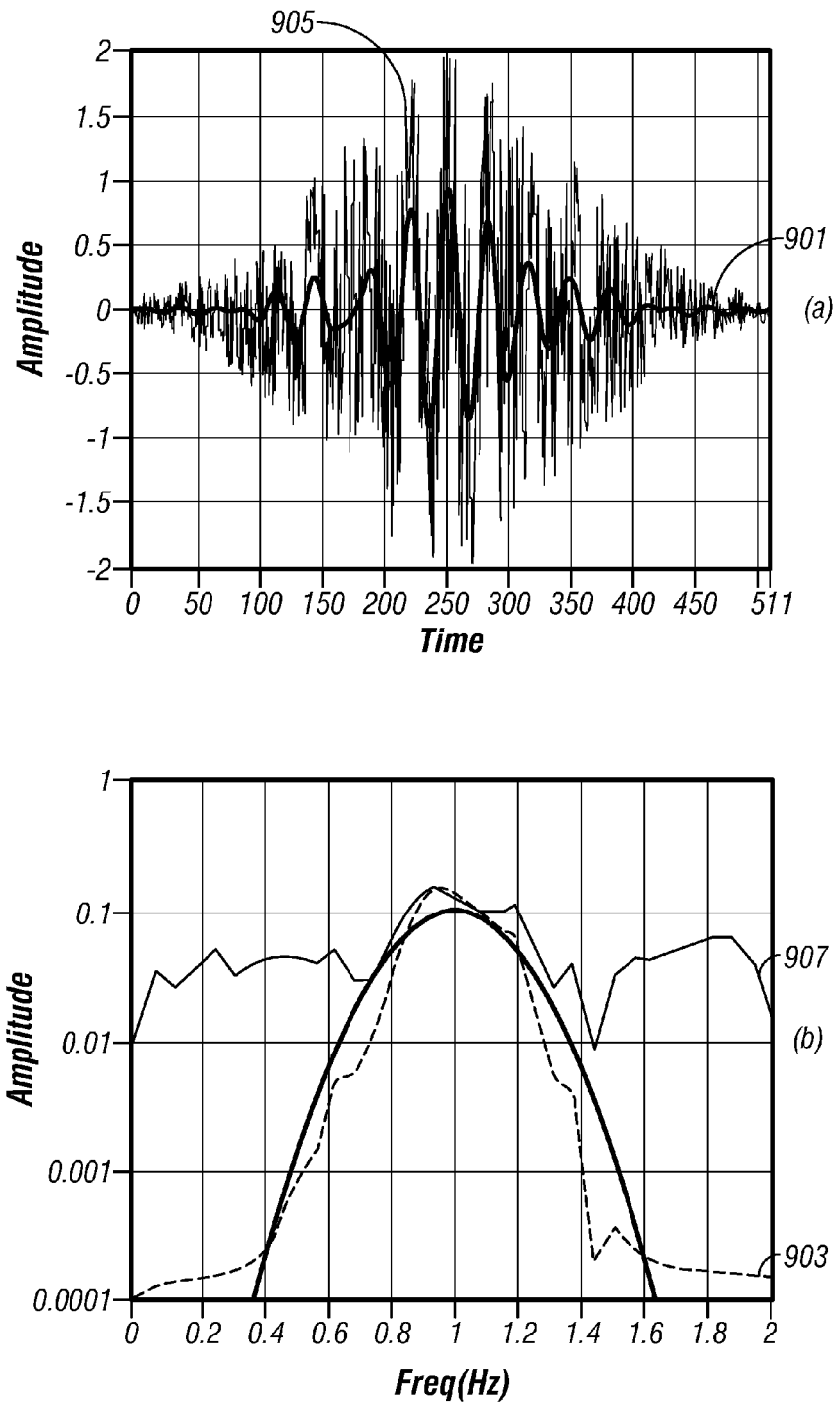
FIGS. 9(a), 9(b) show an exemplary filtered signal and noise (a) in the time domain and in the frequency domain (b)

In theory, $g_M(\alpha,\mu,f_c,t)$ is a band-pass filer (BPF). It can attenuate the noise outside of the pass-band. FIG. 8(a) shows a signal 801 and the additive white noise 805 at an SNR of about 0 dB while FIG. 8(b) shows the signal 803 in the frequency domain and the additive white noise 807. 901 and 905 in FIG. 9(a) show the filtered signal and noise respectively in the time domain, while 903 and 905 in FIG. 9(b) show the filtered signal and noise in the frequency domain.

Figure 10:
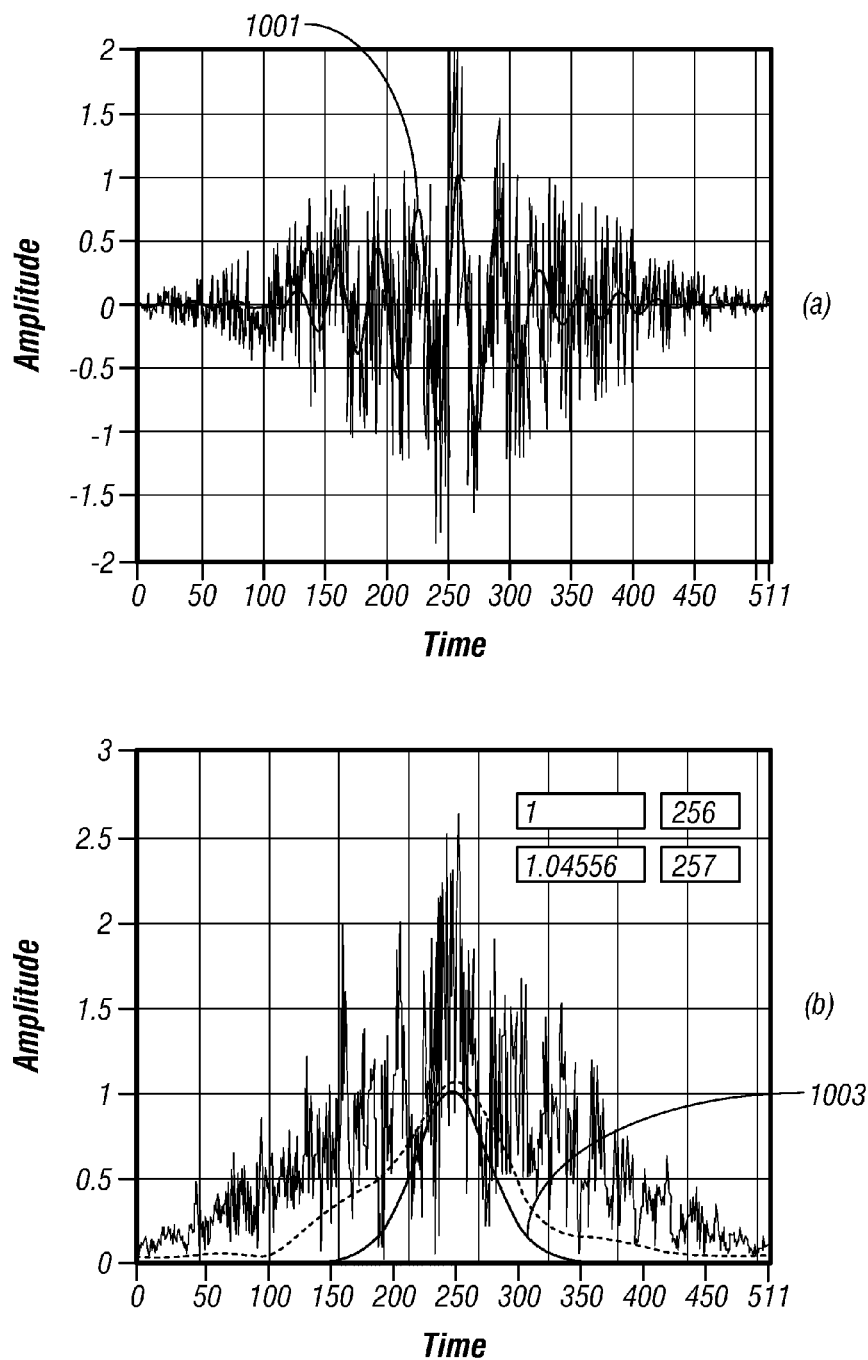
FIGS. 10(a), 10(b) show a demodulated signal envelope and peak of the envelope.

The amplitude of the carrier signal is, from eqn. (5), given by:

$$A_{f_c} = \max[A(t)]|_{t=t_c} \quad (16),$$

where $t_c$ is the location of the peak point of A(t). The demodulated envelope curve and the peak detected value are shown by 1001 in FIGS. 10(a) and 1003 in FIG. 10(b).

Figure 11:
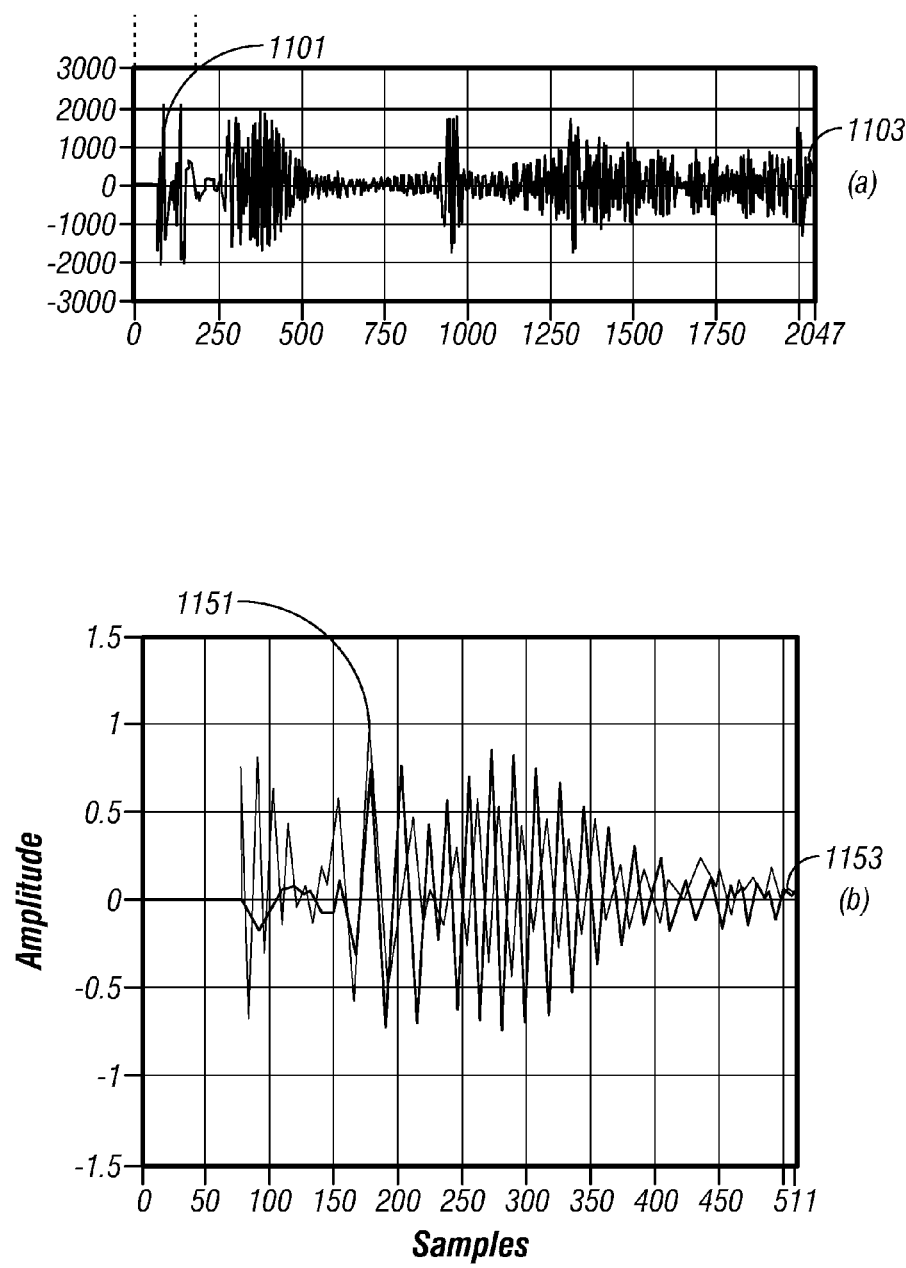
FIGS. 11(a), 11(b) show exemplary bench data and a detailed window thereof.
Figure 12:
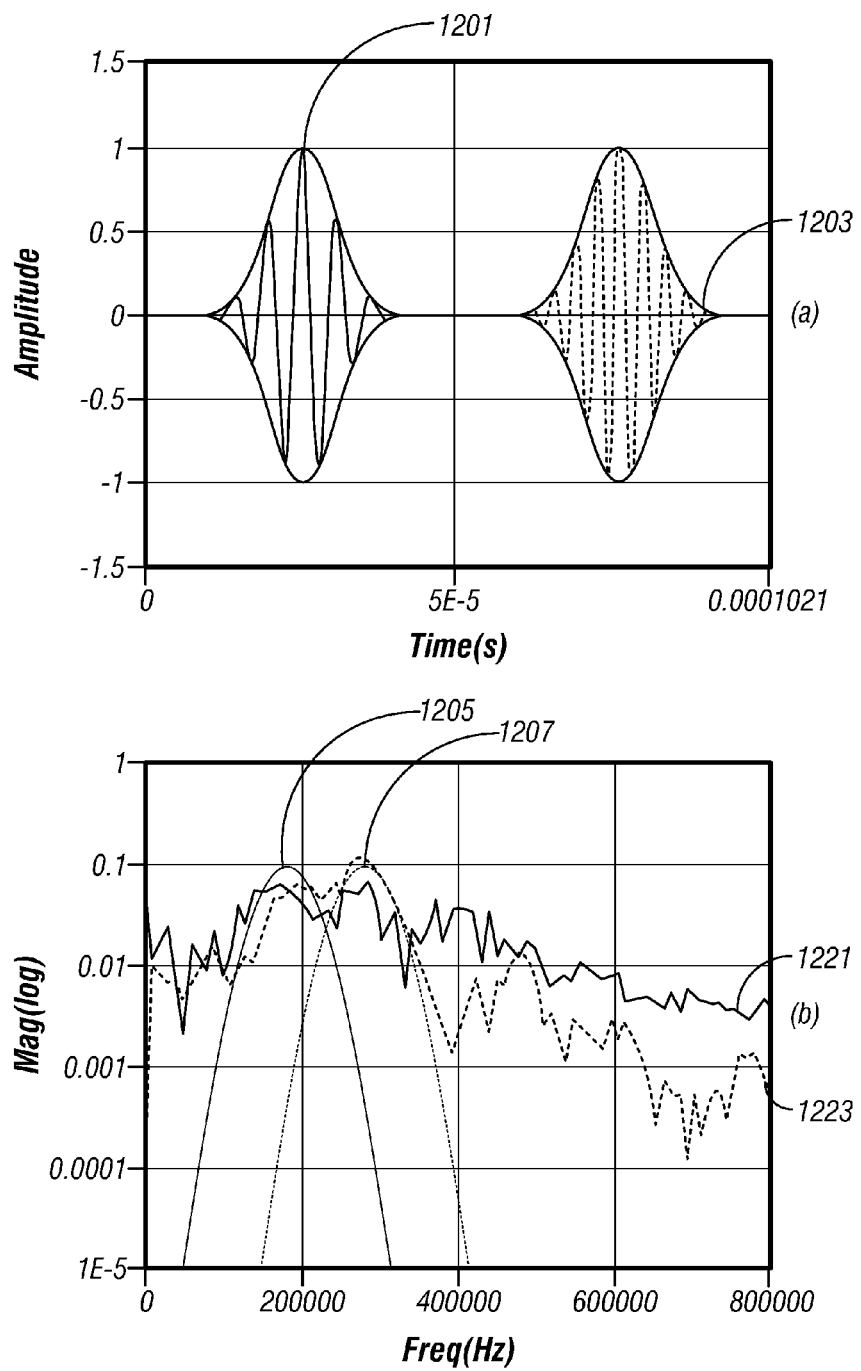
FIG. 12(a) shows exemplary operators for the SH0 and SH1 wavelets.
FIG. 12(b) shows the spectra of the SH0 and SH1 wavelets of FIG. 12(a) and the input signal.
Figure 13:
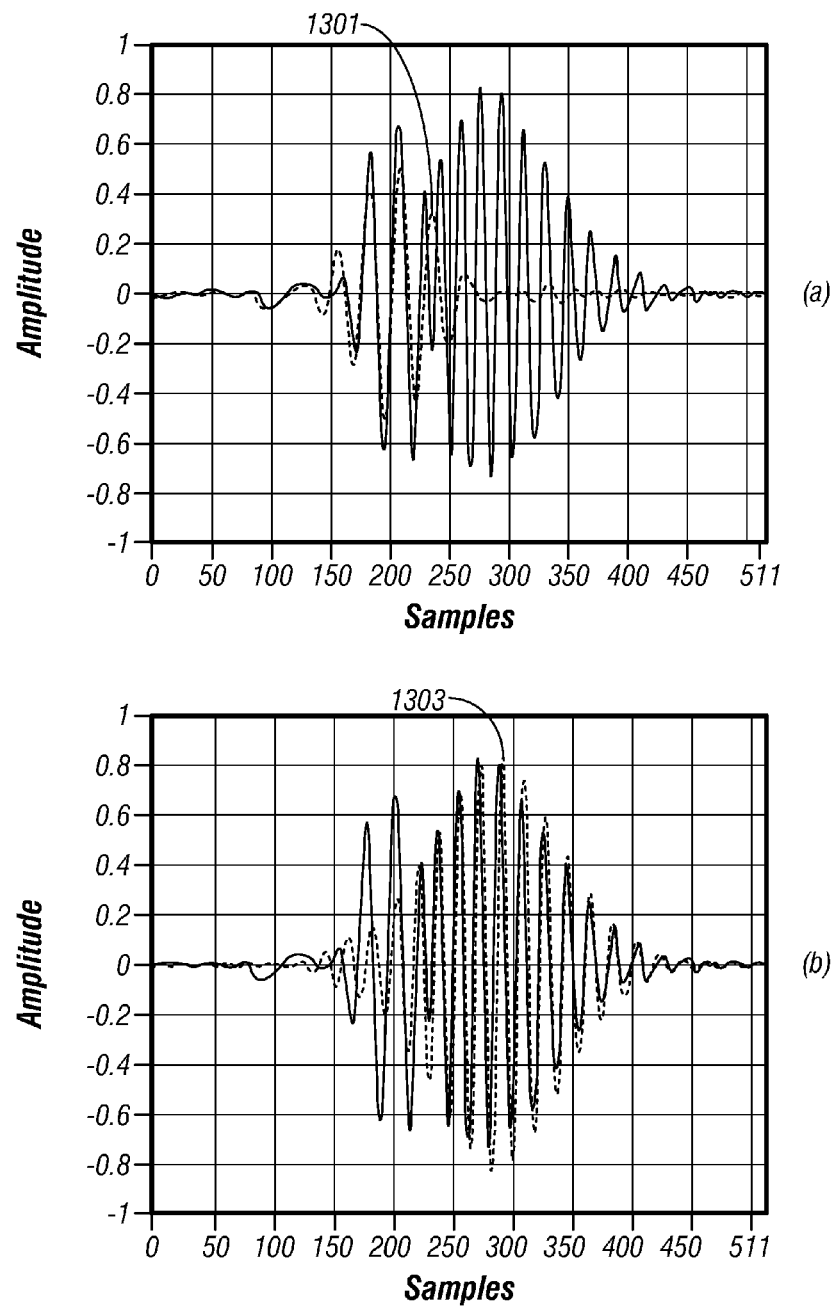
FIGS. 13(a), 13(b) show reconstructed wavelets recovered from the input signal.

The principles described above are next applied to acquired data in a bench test. Shown in FIG. 11(a) are two exemplary signals 1101, 1103. The signals in FIG. 11(a) include multiple arrivals of SH0 and SH1. A window of the signals in FIG. 11(a) is shown in detail in FIG. 11(b) by 1151 and 1153. In FIG. 11(b), only the first arrivals are shown, and correspond to the signals 501, 503 I FIG. 5. The data includes SH0 arrivals (at ≈180 kHz) and SH1 arrivals (at ≈280 kHz), and two wavelet operators are used to reconstruct the acquired signal. The operators are shown in the time domain by 1201 and 1203 in FIG. 12(a), while FIG. 12(b) shows the spectra of the wavelet operators 1205 and 1207 along with the spectra of the two input signals. FIG. 13(a) shows the original signal 1153 and the recovered SH0 signal 1301 while FIG. 13(b) shows the original signal 1153 and the recovered SH1 signal 1303.

Figure 14:
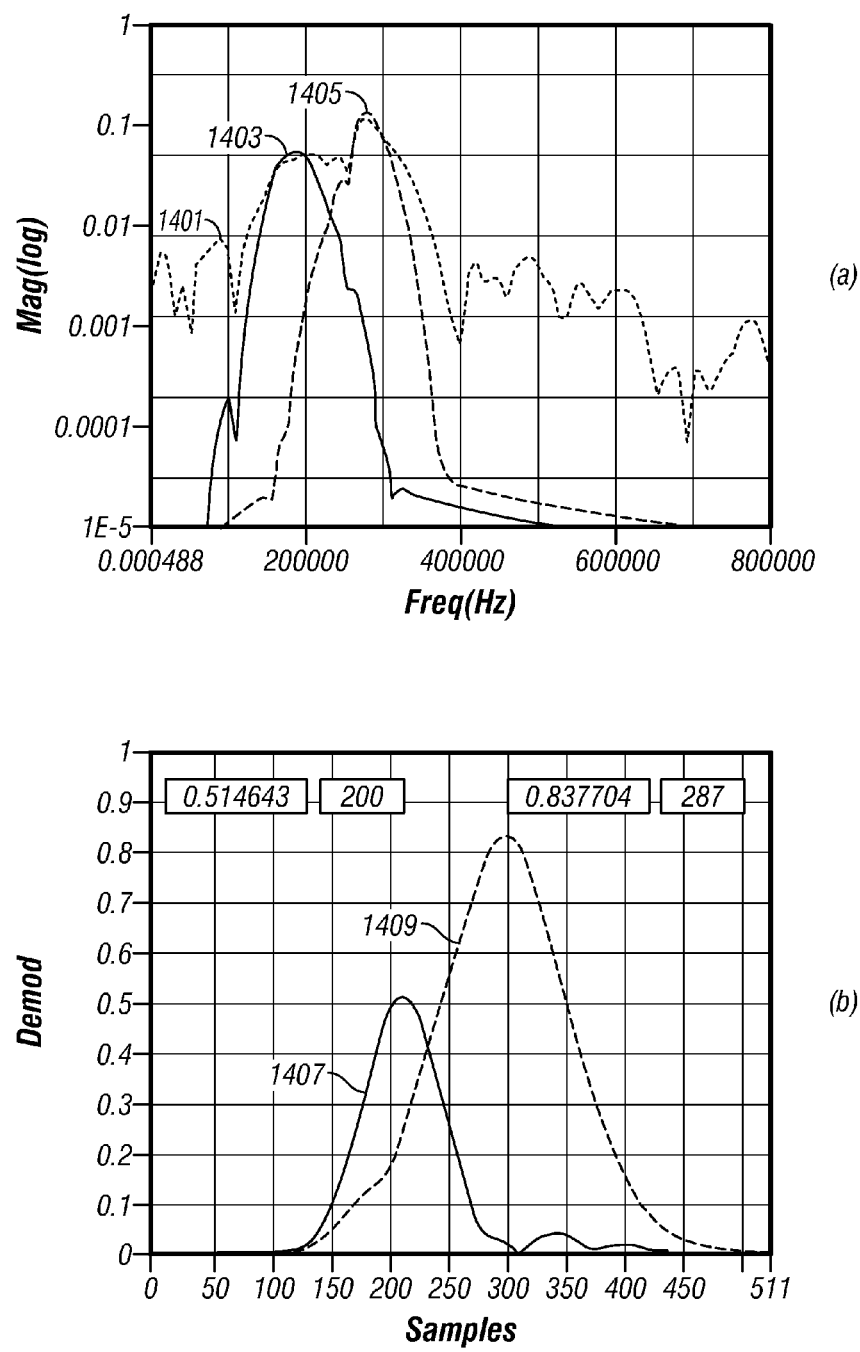
FIG. 14(a) shows the reconstructed spectra using the SH0 and SH1 wavelets along with the data of FIG. 11(b)
FIG. 14(b) shows the reconstructed data signal using the SH0 and SH1 wavelets.

FIG. 14(a) shows the spectrum 1401 of the data 1153 in FIG. 11(b), along with the reconstructed spectrum using the SH0 wavelet 1403, and the reconstructed spectrum using the SH1 wavelet 1405. FIG. 14(b) shows the envelope 1407 of the reconstructed signal using the SH0 wavelet and the envelope 1409 of the reconstructed signal using the SH1 wavelet.

Figure 15:
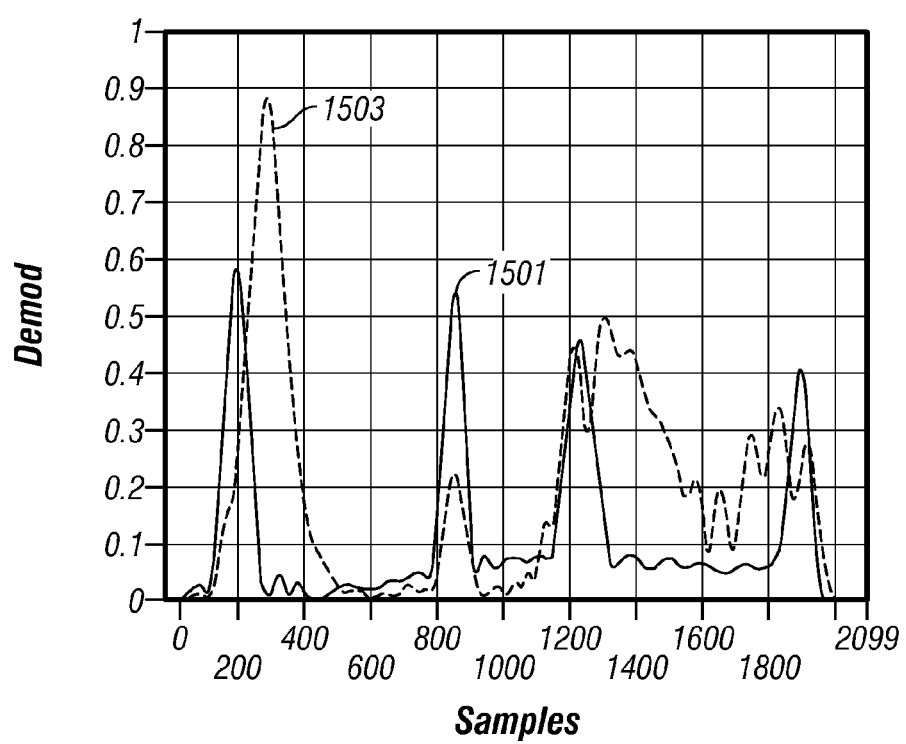
FIG. 15 shows the envelope of the signal of FIG. 11(a) recovered using the SH0 and SH1 wavelets.

FIG. 15 shows the result of processing the signal of FIG. 11(a) using the SH0 wavelet 1501 and the SH1 wavelet 1503 to estimate the envelope peak amplitudes and times. As can be seen, each of the curves 1501 and 1503 shows more than one arrival (event). The different events are the result of propagation through the casing in opposite directions, the earliest arrival being associated with the shortest path from the transmitter to the receiver. The geometry associated with the different arrivals is straightforward, and the analysis of the amplitudes is discussed in Barolak.

The disclosure above has been for a specific wireline tool used analysis of the casing and quality of cement bond. The principles outlined above may also be used for analysis of reflection signals acquired with wireline or in MWD applications. See, for example, U.S. Pat. No. 5,491,668 to Priest et al., and US2007/0005251 of Chemali et al., having the same assignee as the present disclosure the contents of which are incorporated herein by reference. A point of difference between the casing signals discussed in the present disclosure and the reflected signals is that the latter are subject to more attenuation than are the guided casing signals.

Figure 16:
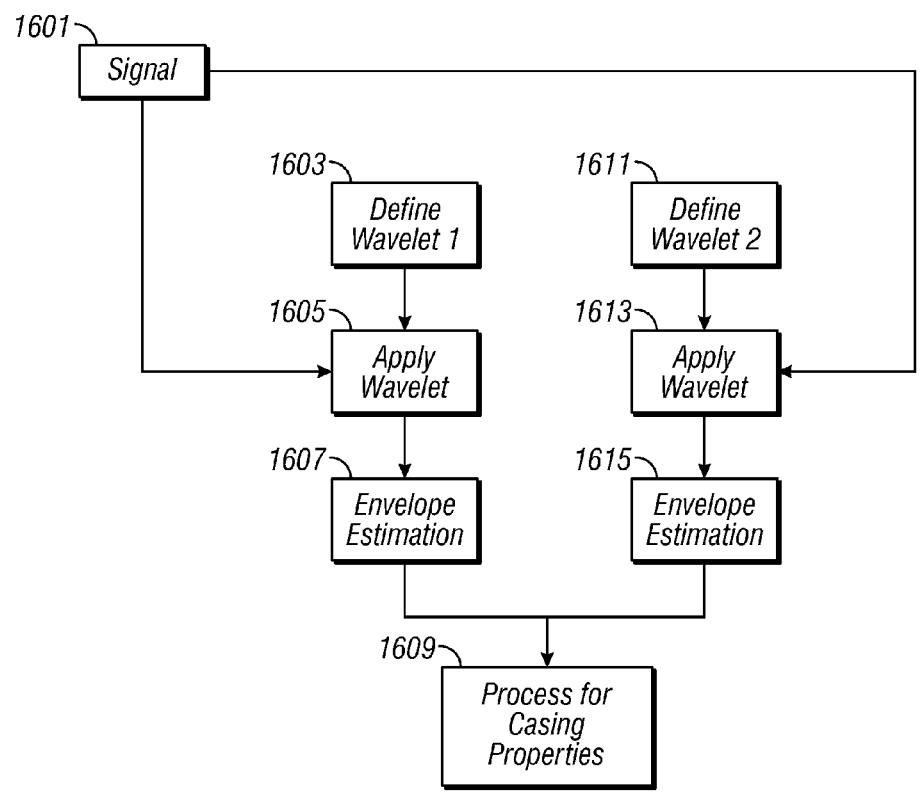
FIG. 16 is a flow chart illustrating some of the steps of the present disclosure.

FIG. 16 is a flow chart that summarizes the method of the present disclosure. Starting with a signal 1601, one or more wavelets are defined 1603, 1611. In one embodiment, the wavelets are band-limited Gaussian functions, such as given by eqn. (9). The wavelet characteristics may be defined by the nominal bandwidth and attenuation. The wavelets are applied 1605, 1613 to the signal, using a suitable windowing function such as a Hanning weighting or a Hamming weighting. A Hilbert transform is used to estimate the envelope of the filtered signals and the peak amplitude and arrival times in the envelope are identified 1607, 1615. Based on the estimated arrival times and amplitudes of the signals, the casing and cement bond parameters are estimated 1609.

Based on travel-times and amplitudes of the detected arrivals, using known methods, it is then possible to determine one or more of the following: (i) a thickness of the casing, (ii) the acoustic impedance of the cement in proximity to the casing, (iii) a position and size of a void in the cement, and (iv) a position and size of a defect in the casing.

Implicit in the processing of the data is the use of a computer program implemented on a suitable non-transitory computer-readable medium that enables the at least one processor to perform the control and processing. The non-transitory computer-readable medium may include, but is not limited to, one or more of: ROMs, EPROMs, EAROMs, Flash Memories and Optical disks. The determined formation properties may be recorded on a suitable medium and used for subsequent processing upon retrieval of the BHA. The determined formation properties may further be telemetered uphole for display and analysis.

The foregoing description is directed to particular embodiments of the present disclosure for the purpose of illustration and explanation. It will be apparent, however, to one skilled in the art that many modifications and changes to the embodiment set forth above are possible without departing from the scope and the spirit of the disclosure. It is intended that the following claims be interpreted to embrace all such modifications and changes.

What is claimed is:

1. A method of characterizing a casing installed in a borehole in an earth formation, the method comprising:
activating a transducer at at least one azimuthal orientation in the borehole and generating an acoustic pulse;
receiving a signal comprising a plurality of events resulting from the generation of the acoustic pulse;
bandpassing the received signal using two modulated filters in a time domain, the two modulated filters being orthogonal to one another, and providing a bandpassed signal;
estimating an envelope of the bandpassed signal; and
estimating from the envelope of the bandpassed signal an arrival time of each of the plurality of events, the arrival times being characteristic of a property of at least one of: (i) the casing, and (ii) a cement in an annulus between the casing and the formation.

2. The method of claim 1, wherein a first filter of the two modulated filters is in phase with the received signal and a second filter of the two modulated filters is in quadrature with the received signal.

3. The method of claim 2, wherein the two modulated filters are both one of:
(i) modulated Gaussian filters and (ii) modulated Cauchy Wavelets.

4. The method of claim 1 further comprising estimating from the envelope an amplitude of each of the events.

5. The method of claim 1 wherein estimating the envelope of the received signal further comprises applying a Hilbert transform.

6. The method of claim 1 wherein activating the transducer at at least one azimuthal orientation further comprises activating the transducer at a plurality of azimuthal orientations, the method further comprising estimating the property at the plurality of azimuthal orientations.

7. The method of claim 5 wherein estimating the property at the plurality of azimuthal orientations further comprises estimating an attenuation of a selected mode of propagation characterizing an event.

8. The method of claim 1 further comprising, using for the transducer, an electromagnetic acoustic transducer coupled to the casing.

9. The method of claim 1 wherein the property is selected from the group consisting of: (i) a thickness of the casing, (ii) an acoustic impedance of the cement in proximity to the casing, (iii) a position and size of a void in the cement, and (iv) a position and size of a defect in the casing.

10. The method of claim 1 further comprising conveying the transducer on a logging tool into the borehole using a wireline.

11. An apparatus for characterizing a casing installed in a borehole in an earth formation, the apparatus comprising:
a transducer configured to generate an acoustic pulse at at least one azimuthal orientation in the borehole;
a receiver configured to receive a signal comprising a plurality of events resulting from the generation of the acoustic pulse; and
at least one processor configured to:
bandpass the received signal using two modulated filters in a time domain, the two modulated filters being orthogonal to one another, and provide a bandpassed signal;
estimate an envelope of the bandpassed signal; and
estimate from the envelope of the received signal an arrival time of each of the plurality of events, the arrival times being characteristic of a property of at least one of: (i) the casing, and (ii) a cement in an annulus between the casing and the formation.

12. The apparatus of claim 11, wherein a first filter of the two modulated filters is in phase with the received signal and a second filter of the two modulated filters is in quadrature with the received signal.

13. The apparatus of claim 12, wherein the two modulated filters are both one of: (i) modulated Gaussian filters and (ii) modulated Cauchy Wavelets.

14. The apparatus of claim 11 wherein the receiver is part of the transducer.

15. The apparatus of claim 11 wherein the transducer further comprises an electromagnetic acoustic transducer coupled to the casing.

16. The apparatus of claim 11 wherein the at least one processor is further configured to estimate from the envelope an amplitude of each of the events.

17. The apparatus of claim 11 wherein the at least one processor is further configured to estimate the envelope of the received signal by applying a Hilbert transform.

18. The apparatus of claim 11 wherein the transducer is further configured to be activated at a plurality of azimuthal orientations and wherein the at least one processor is further configured to estimate the property at a plurality of azimuthal orientations.

19. The apparatus of claim 16 wherein the at least one processor is further configured to estimate the property at the plurality of azimuthal orientations by estimating an attenuation of a selected mode of propagation characterizing an event.

20. The apparatus of claim 12 wherein the at least one processor is further configured to estimate a property that is selected from the group consisting of: (i) a thickness of the casing, (ii) an acoustic impedance of the cement in proximity to the casing, (iii) a position and size of a void in the cement, and (iv) a position and size of a defect in the casing.

21. The apparatus of claim 12 further comprising a wireline configured to convey the transducer on a logging tool into the borehole.

22. A non-transitory computer-readable medium product having instructions thereon that, when executed, cause at least one processor to perform a method of characterizing a casing installed in a borehole in an earth formation, the method comprising:
activating a transducer at at least one azimuthal orientation in the borehole and generating an acoustic pulse;
receiving a signal comprising a plurality of events resulting from the generation of the acoustic pulse;
bandpassing the received signal using two modulated filters in a time domain, the two modulated filters being orthogonal to one another, and providing a bandpassed signal;
estimating an envelope of the bandpassed signal; and
estimating from the envelope of the bandpassed signal an arrival time of each of the plurality of events, the arrival times being characteristic of a property of at least one of: (i) the casing, and (ii) a cement in an annulus between the casing and the formation.

23. The non-transitory computer-readable medium product of claim 22 further comprising at least one of: (i) a ROM, (ii) an EPROM, (iii) an EAROM, (iv) a flash memory, and (v) an optical disk.

* * * * *